(12) United States Patent
Bartlett

(10) Patent No.: US 6,369,779 B1
(45) Date of Patent: Apr. 9, 2002

(54) DISPLAY ARRANGEMENTS

(75) Inventor: Christopher T Bartlett, Maidstone (GB)

(73) Assignee: BAE Systems Electronics Limited (GB)

(*) Notice: Subject to any disclaimer, the term of this patent is extended or adjusted under 35 U.S.C. 154(b) by 0 days.

(21) Appl. No.: 09/085,697

(22) Filed: May 27, 1998

(30) Foreign Application Priority Data

Apr. 4, 1998 (GB) .............................................. 9807186

(51) Int. Cl.[7] .................................................. G09G 5/00
(52) U.S. Cl. ................................. 345/8; 345/7; 359/13; 349/11
(58) Field of Search .................. 345/1, 7, 8, 9, 345/1.1, 1.2, 2.1, 2.3, 3.1; 349/11; 359/13, 632, 630; 348/114, 115

(56) References Cited

U.S. PATENT DOCUMENTS

| | | | |
|---|---|---|---|
| 3,936,136 A | | 2/1976 | Litman |
| 4,439,157 A | * | 3/1984 | Breglia et al. ............... 434/40 |
| 4,806,007 A | | 2/1989 | Bindon |
| 4,969,714 A | * | 11/1990 | Fournier, Jr. et al. ....... 353/174 |
| 5,166,778 A | | 11/1992 | Beamon, III |
| 5,272,098 A | | 12/1993 | Smayling et al. |
| 5,281,960 A | * | 1/1994 | Dwyer, III ................... 345/31 |
| 5,355,181 A | * | 10/1994 | Ashizaki et al. ............ 348/744 |
| 5,416,876 A | * | 5/1995 | Ansley et al. ................. 345/8 |
| 5,448,772 A | | 9/1995 | Grandfield |
| 5,456,035 A | | 10/1995 | Stiles |
| 5,574,755 A | | 11/1996 | Persico |
| 5,596,339 A | * | 1/1997 | Furness, III et al. ........... 345/8 |
| 5,684,496 A | * | 11/1997 | Parus ............................ 345/8 |
| 5,684,498 A | * | 11/1997 | Welch et al. .................. 345/8 |
| 5,812,224 A | * | 9/1998 | Maeda et al. .................. 345/8 |
| 5,982,553 A | * | 9/1999 | Bloom et al. ................ 359/627 |
| 6,057,966 A | * | 5/2000 | Carroll et al. .............. 359/630 |
| 6,151,167 A | * | 11/2000 | Melville ..................... 359/618 |

FOREIGN PATENT DOCUMENTS

| | | |
|---|---|---|
| EP | 0 253 991 A2 | 5/1987 |
| EP | 0 367 534 A2 | 5/1990 |
| EP | 0 435 523 A2 | 7/1991 |
| EP | 0 460 983 A1 | 12/1991 |
| EP | 0 491 488 A1 | 6/1992 |
| EP | 0 661 574 A2 | 7/1995 |
| EP | 0 687 933 A2 | 12/1995 |
| FR | 2 522 804 | 3/1982 |
| GB | 1 505 873 | 3/1978 |
| GB | 2 162 654 A | 2/1986 |
| GB | 2 177 869 A | 1/1987 |
| GB | 2 181 266 A | 4/1987 |
| GB | 2 238 138 A * | 5/1991 |
| GB | 2 278 692 A | 12/1994 |
| WO | WO 98/12599 | 3/1998 |

OTHER PUBLICATIONS

H.S. Upton and J.R. Goodman, *Eyeglass Heads–Up–Displays*, Proceedings of the Sid, Vo. 23, No. 2, 1982, pp. 77–80.

* cited by examiner

*Primary Examiner*—Bipin Shalwala
*Assistant Examiner*—Mansour M. Said
(74) *Attorney, Agent, or Firm*—Kirschstein, et al.

(57) ABSTRACT

A display arrangement particularly suitable for replacing a conventional CRT in a pilot's helmet mounted display includes a light source having a modulated output which is scanned by a scanner across a screen to produce an image. The image is transferred into the pilot's field of view by relay optics. The scanner and screen are mounted on the pilot's helmet and the light source is remote therefrom.

25 Claims, 1 Drawing Sheet

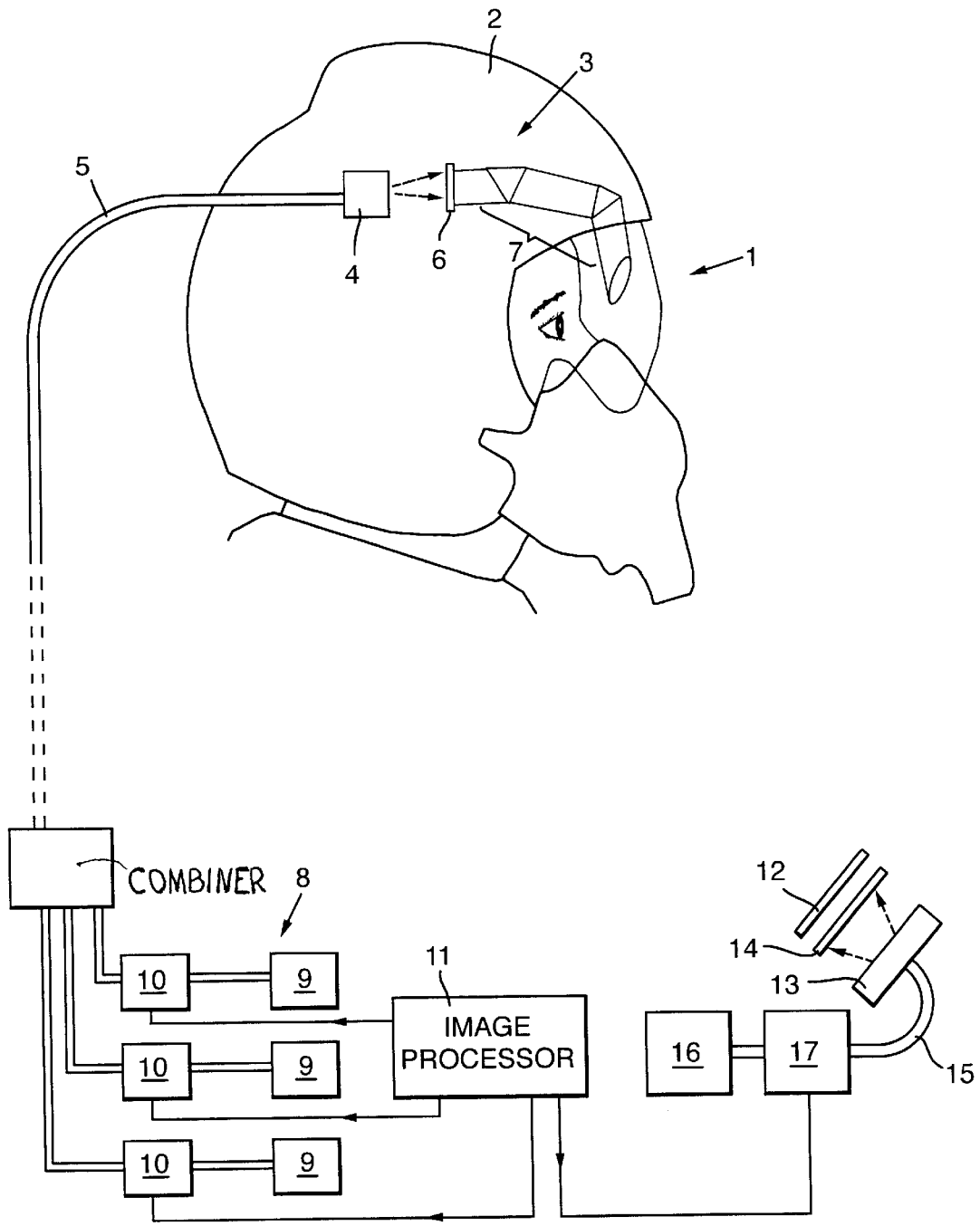

DISPLAY ARRANGEMENTS

FIELD OF THE INVENTION

This invention relates to display arrangements and more particularly, but not exclusively, to helmet-mounted displays used by aircraft pilots.

BACKGROUND TO THE INVENTION

In a conventional helmet-mounted display, a small cathode ray tube (CRT) is mounted on the helmet of the pilot or other member of the air crew. The electron beam of the CRT is scanned over its faceplate to generate an image. Specially designed relay optics interface with the CRT faceplate to convey the image into the field of view of the pilot, typically being presented on a combiner attached to the helmet. The relay optics are generally quite complex, involving several elements for focussing and directing the image, and require a significant degree of design effort to integrate them with the CRT and with the part of the system which the pilot actually views. For example, if the image is to be projected onto a visor, the curvature of the visor, which may present a complex optical surface, must be taken into account. Electrical cabling connects the CRT to the power supply and also includes an electrical path for applying control signals to the CRT for scanning the electron beam and modulating it with the required information.

The present invention seeks to provide an improved display arrangement which is particularly suitable for use in helmet-mounted displays but which could also have application in other fields and in non-military environments.

SUMMARY OF THE INVENTION

According to the invention, there is provided a display arrangement comprising: a display device having a screen at which an image is produced and means for optically relaying an image from the device for viewing by a user, the display device comprising a light source, means for modulating light from the source with image information and a scanner for scanning modulated light over the screen, the screen and scanner being head mounted.

By employing the invention, it is possible to provide to a user an image of the same or superior quality as would be achieved with a CRT-based display arrangement and also provide a number of advantages. A CRT display is located close to the user's head and requires a high voltage supply. It also requires a relatively large and unwieldy umbilical cable to provide the electrical supply to the CRT. This leads to difficulties in adequately shielding the long run of cable to prevent electromagnetic interference effects. The size and weight of the umbilical may also inhibit the pilot's head movements and can be particularly problematical where the aircraft is expected to undergo maneuvers involving high gravitational forces. Also, the designer must ensure that if a pilot is forced to eject from the aircraft, the umbilical will readily detach. In contrast, a display arrangement in accordance with the invention does not require a high voltage supply to produce an image on the screen. Preferably, the light source is remotely located from the user's head and is connected to the scanner via fibre optic means. It may be sufficient to have only a single, mono-filament optical fibre connecting the light source and scanner. Thus, the potential danger of having a high voltage supply is avoided and the umbilical to supply the display arrangement is of considerably less weight than the HV supply of a conventional CRT arrangement, is less restrictive of head movement and easier to detach in the event of pilot ejection. Also, electromagnetic interference problems are greatly reduced. Any electrical supply to the light source can be much more easily shielded as it is compact and may be included in already existing shielding arrangements for other electrical systems in a cockpit.

Also, the head-mounted parts of a display arrangement in accordance with the invention can be made much lighter in weight than the CRT components and also occupy the same or a reduced volume as compared to a CRT. According to a particularly advantageous feature of the invention, a display apparatus includes an optical relay designed for use with a CRT and a display arrangement in accordance with the invention wherein the screen is located substantially in the position which would be occupied by a CRT faceplate if a CRT were included instead of the display arrangement. The display arrangement in accordance with the invention may be used as a straight replacement for the CRT of a previously designed and installed display arrangement. It is not therefore necessary to completely redesign the relay optics or other means for conveying the image to the user. Replacement may be carried out with very little disruption to the parts of the system already installed and the advantages which arise from using the invention may thus be incorporated into a previously existing, conventional arrangement with what is effectively a minor modification. The modification is also relatively inexpensive to implement as there is no significant redesign involved in installing it.

A further advantage arising from the invention is that the display may be a color display although, of course, monochrome may be provided. In normal helmet-mounted displays using CRTs, monochrome only is available because the shadow mask required for color cannot be accommodated in the small space available and also vibration can be a problem. Furthermore, a very bright display is required and this is difficult to achieve in small color CRT displays.

In a display arrangement in accordance with the invention, the light source may be a single laser or a single LED (light emitting diode). Modulation of the light may be implemented by using a modulated light source, for example, a modulated LED or miniature laser diode or by modulating light subsequent to its generation. In other embodiments, a plurality of lasers or a plurality of LEDs may be included or it may be desirable, in some arrangements, to have a combination of the two types of light source. The plurality of lasers and/or LEDs may emit light of different wavelengths to give a color display. The image produced for viewing by the user may include alphanumeric information, for example, data concerning an aircraft's altitude, heading and velocity or other information concerning aircraft systems or weapon status, in the case of military aircraft. Alternatively, or in addition, the image may be a pictorial display, for example, giving a representation of the view outside the cockpit as sensed, for example, by infrared imagers or image intensifiers. Alternatively, such pictorial information may comprise map data, for example.

The scanner may be arranged to direct the light beam using, for example, electromagnetic, electro-mechanical or acousto-optic means. In the latter case, the scanner may be operable without requiring a direct electrical supply to be provided from the aircraft, control being by way of modulated light signals transmitted along an optical fibre link.

The screen of the display arrangements mounted on the helmet may, for example, be a plain glass plate or, for example, could be a dispersive hologram.

According to a feature of the invention, an aircraft cockpit includes a plurality of displays, at least one of which is a display arrangement in accordance with the invention mounted on a helmet and at least one other of which is a head-down or head-up display comprising a light source, means for modulating light from the source with image information and a scanner for scanning modulated light over a screen. Thus, by using this aspect of the invention, it is possible not only to replace the conventional CRT display mounted on the pilot's helmet, but also at least one CRT found in other parts of the aircraft cockpit and preferably all of them include a similar display arrangement, thus eliminating CRT displays from the cockpit entirely, with the attendant advantages as discussed previously.

BRIEF DESCRIPTION OF DRAWING

One way in which the invention may be performed is now described, by way of example, with reference to the accompanying drawing in which the sole FIGURE schematically illustrates a display arrangement in accordance with the invention.

DESCRIPTION OF PREFERRED EMBODIMENT

With reference to the FIGURE, an aircraft pilot 1 wears a helmet 2 on which is mounted a display arrangement shown generally at 3 which is arranged to present an image to him on a visor or combiner.

The display arrangement 3 includes an acousto-optical scanner 4 for scanning a light beam transmitted to it via an optical fibre bundle 5 across a screen 6 which interfaces with relay optics 7 to transmit the image produced at the screen 6 into the pilot's field of view. The optical fibre bundle 5 is connected at its other end, remote from the helmet 2, to a light source 8 comprising a plurality of lasers 9 having outputs at respective different wavelengths and a plurality of modulators 10 associated with respective ones of the lasers 9.

An image processor 11 is connected to the modulators 10 to control the outputs of the light source 8, the light beams being combined following modulation and transmitted along the optical fibre 5 to the scanner 4. The scanner 4 causes the modulated light beam to be scanned across the diffusive screen 6 in a raster pattern to produce an image for viewing by the pilot 1.

The image may comprise alphanumerical information concerning the aircraft's flight, for example, or may consist of a pictorial display, for example, as may be obtained by an infra-red camera mounted to view the scene ahead of the aircraft. A combination of the two types of image information may also be produced at the screen 6 and then conveyed via relay optics 7 for viewing by the pilot 1.

In this arrangement, the relay optics 7 were originally designed for use with a CRT display in which the faceplate of the CRT would have been located in the position now occupied by the screen 6.

The pilot's cockpit includes an additional display 12 to be viewed as a head-down display. The head-down display 12 is also produced by scanning a modulated photon beam using a scanner 13 across a screen 14 to produce the desired image. An optical fibre 15 conveys modulated light from the light source 16 and modulator 17 which is also controlled by image processor 11 to produce the required image.

I claim:

1. A display arrangement, comprising:
   A) a first apparatus including
      i) a helmet worn on a user's head, and having a display surface positioned forwardly of the user's eyes,
      ii) a first light source remote from the helmet, for generating a first light beam,
      iii) a first modulator remote from the helmet, for modulating the first light beam with information relating to a first image to be displayed,
      iv) a first optical fiber for conveying the first light beam modulated by the first modulator to the helmet,
      v) a generally planar, light transmissive, first screen supported by the helmet,
      vi) a first scanner supported by the helmet, for scanning the modulated, first light beam over the first screen to produce the first image on the first screen, and
      vii) an optical relay supported by the helmet and interfaced with the first screen, for relaying the first image on the first screen to the display surface for viewing by the user;
   B) a second apparatus including
      i) a display panel remote from the helmet;
      ii) a second light source remote from the helmet, for generating a second light beam,
      iii) a second modulator remote from the helmet, for modulating the second light beam with information relating to a second image to be displayed,
      iv) a generally planar, light transmissive second screen remote from the helmet,
      v) a second scanner remote from the helmet,
      vi) a second optical fiber for conveying the second light beam modulated by the second modulator to the second scanner, and
      vii) the second scanner being operative for scanning the modulated, second light beam over the second screen to produce the second image on the display panel for viewing by the user; and
   C) an image processor operatively connected to the first and second modulators, for processing the first and second images.

2. The arrangement of claim 1; and further comprising an aircraft cockpit in which the first and second apparatus are mounted.

3. The arrangement of claim 1, wherein the display surface is a front curved part of the helmet extending over the user's eyes.

4. The arrangement of claim 3, wherein the front curved part is a visor.

5. The arrangement of claim 3, wherein the front curved part is a combiner.

6. The arrangement of claim 1, wherein the first light source comprises at least one laser.

7. The arrangement of claim 1, wherein the first light source comprises at least one light emitting diode.

8. The arrangement of claim 1, wherein the first light source comprises a plurality of source components operative for generating different light beams of different wavelengths.

9. The arrangement of claim 8, wherein the first modulator comprises a plurality of modulating components operative for respectively modulating the different light beams.

10. The arrangement of claim 9, wherein the first optical fiber comprises a bundle of light carriers.

11. The arrangement of claim 1, wherein the first scanner is operative for sweeping the modulated light beam over a glass plate which constitutes the first screen to produce the image in the form of at least one of alphabetical, numerical, and pictorial information.

12. The arrangement of claim 1, wherein the first scanner is operative for sweeping the modulated light beam over a holographic plate which constitutes the first screen to produce the image in the form of at least one of alphabetical, numerical, and pictorial information.

13. The arrangement of claim 1, wherein the optical relay includes a plurality of optical components for use with a cathode ray tube and for being interfaced with a faceplate of the tube.

14. A method of retro-fitting a display arrangement including:

A) a structure worn on a user's head, and having a display surface positioned forwardly of the user's eyes, B) a cathode ray tube supported by the structure, and having a faceplate on which an image to be displayed is scanned, and C) an optical relay supported by the structure, and interfaced with the faceplate, for relaying the image on the faceplate to the display surface for viewing by the user, the method comprising the steps of:

a) replacing the tube with a scanner, and positioning a generally planar, light transmissive screen in a position on the helmet formerly occupied by the faceplate; and b) connecting an optical fiber to the scanner, and conveying a light beam modulated with information relating to the image to the scanner for scanning the modulated light beam over the screen to produce the image on the screen, and for relaying the image on the screen to the display surface for viewing by the user.

15. The method of claim 14, and configuring the structure as a helmet, and configuring the display surface as a front curved part of the helmet extending over the user's eyes.

16. The method of claim 15, and configuring the front curved part as a visor.

17. The method of claim 15, and configuring the front curved part as a combiner.

18. The method of claim 14, and generating the light beam from a light source which comprises at least one laser.

19. The method of claim 14, and generating the light beam from a light source which comprises at least one light emitting diode.

20. The method of claim 14, and generating different light beams of different wavelengths from a plurality of light sources.

21. The method of claim 20, and modulating the different light beams with a plurality of modulating components.

22. The arrangement of claim 21, wherein the connecting step is performed by an optical fiber comprises a bundle of light carriers.

23. The method of claim 14, wherein the scanning step is performed by sweeping the modulated light beam over a glass plate which constitutes the screen to produce the image in the form of at least one of alphabetical, numerical, and pictorial information.

24. The method of claim 14, wherein the scanning step is performed by sweeping the modulated light beam over a holographic plate which constitutes the screen to produce the image in the form of at least one of alphabetical, numerical, and pictorial information.

25. The method of claim 14, and forming the optical relay of a plurality of optical components.

\* \* \* \* \*